US009777855B2

(12) United States Patent
Myers et al.

(10) Patent No.: US 9,777,855 B2
(45) Date of Patent: Oct. 3, 2017

(54) PRESSURE VACUUM RELIEF VALVE PROVIDING MONITORING CAPABILITIES

(71) Applicant: REGULATOR TECHNOLOGIES TULSA, LLC, Tulsa, OK (US)

(72) Inventors: James Myers, Tulsa, OK (US); Johnny Bowyer, Tulsa, OK (US)

(73) Assignee: Regulator Technologies Tulsa, LLC, Tulsa, OK (US)

( * ) Notice: Subject to any disclaimer, the term of this patent is extended or adjusted under 35 U.S.C. 154(b) by 0 days.

(21) Appl. No.: 14/931,521

(22) Filed: Nov. 3, 2015

(65) Prior Publication Data

US 2016/0138725 A1 May 19, 2016

Related U.S. Application Data

(60) Provisional application No. 62/080,802, filed on Nov. 17, 2014.

(51) Int. Cl.
*F16K 17/02* (2006.01)
*F16K 27/02* (2006.01)
(Continued)

(52) U.S. Cl.
CPC ............ *F16K 17/02* (2013.01); *F16K 17/194* (2013.01); *F16K 27/0263* (2013.01);
(Continued)

(58) Field of Classification Search
CPC .... F16K 17/02; F16K 17/194; F16K 27/0263; F16K 37/00; Y10T 137/7771;
(Continued)

(56) References Cited

U.S. PATENT DOCUMENTS 4,458,535 A * 7/1984 Juergens ............. B60R 16/0232
200/61.49
5,913,330 A 6/1999 Jones et al.
(Continued)

FOREIGN PATENT DOCUMENTS

JP      S5715173 A    1/1982
JP      H08166084 A   6/1996
JP      2002061766 A   2/2002

OTHER PUBLICATIONS

International Search Report and Written Opinion from International Application No. PCT/US2015/060988, dated Mar. 15, 2016.
(Continued)

*Primary Examiner* — William McCalister
(74) *Attorney, Agent, or Firm* — Marshall, Gerstein & Borun LLP (57) ABSTRACT

A mounting assembly is provided for coupling a monitoring device to a valve assembly for relieving vacuum and over pressure conditions in a storage container. The valve assembly includes a body including a first port adapted to be in fluid communication with the storage container and a first valve seat disposed in the body, and a first control assembly including a first valve stem and a first closure element coupled to the first valve stem, the first closure member being movable relative to the first valve seat in response to changes in pressure in the container. The mounting assembly includes a mounting bracket adapted to be coupled to a portion of the body and a mounting tube configured to be slidably coupled to the mounting bracket. The mounting tube is adapted to receive the monitoring device, which is configured to obtain data indicative of the operation of the valve assembly.

18 Claims, 9 Drawing Sheets

(51) Int. Cl.
*F16K 37/00* (2006.01)
*F16K 17/194* (2006.01)

(52) U.S. Cl.
CPC ......... *F16K 37/00* (2013.01); *Y10T 137/7779* (2015.04); *Y10T 137/8242* (2015.04); *Y10T 137/8275* (2015.04)

(58) Field of Classification Search
CPC ......... Y10T 137/7778; Y10T 137/7779; Y10T 137/778; Y10T 137/8225; Y10T 137/8242; Y10T 137/8275; Y10T 137/8292; Y10T 137/8309; Y10T 137/8326; Y10T 137/8342
USPC ...... 137/493, 493.7, 493.8, 493.9, 553, 554, 137/556, 556.3, 556.6, 557, 558
See application file for complete search history.

(56) References Cited

U.S. PATENT DOCUMENTS

| | | | |
|---|---|---|---|
| 6,019,126 A * | 2/2000 | Kelada | F16K 37/0091 137/493.8 |
| 6,305,412 B1 | 10/2001 | Steele | |
| 2002/0063555 A1 | 5/2002 | Maddox | |
| 2004/0168722 A1* | 9/2004 | Veinotte | F02M 25/0809 137/493 |
| 2008/0061769 A1* | 3/2008 | Junk | F16K 37/0033 324/207.22 |
| 2013/0264341 A1 | 10/2013 | Cockerham et al. | |

OTHER PUBLICATIONS

MCG 1097 Wireless Proximity Switch, L&J engineering, Rev. MCG 1097-3A.

* cited by examiner

PRESSURE VACUUM RELIEF VALVE PROVIDING MONITORING CAPABILITIES

FIELD OF THE DISCLOSURE

The present disclosure is directed to pressure vacuum relief valves and, more particularly, a pressure vacuum relief valve that provides monitoring capabilities.

BACKGROUND

Storage containers, such as storage tanks, vessels, conduits, and the like, can be utilized to store various fluids (e.g., oil, gas, etc.). The internal vapor pressure of these storage containers may vary based on various factors, such as, for example, the amount of fluid in the storage container, the temperature of the fluid in the storage container, the volatility of the fluid in the storage tank, and the temperature outside the storage container. Pressures above or below certain thresholds may, however, damage the storage container. For example, positive pressures or vacuum overpressures may cause the storage container to collapse. Pressures above certain thresholds can also lead to excess emissions and product loss, while pressures below certain thresholds can compromise the quality of the fluid stored in the container (as this increases the likelihood that contaminants will be pulled in from the atmosphere).

Pressure vacuum relief valves, which are also known as breather vents, tank vents, and pressure vacuum release vents, can be installed on a storage container to relieve undesirably high or undesirably low pressures in the storage container that can occur as a result of any the above-noted factors. Pressure vacuum relief valves are, however, difficult to monitor because they are often installed on top of storage containers. As such, it can be difficult to assess whether a pressure vacuum relief valve, when installed on a storage container, is the appropriate size for that storage container and is operating properly. An incorrectly sized pressure vacuum relief valve will tend to be overactive (e.g., opening when it does not need to, opening and closing more frequently than necessary), and will likely wear out prematurely. An overactive pressure vacuum relief valve is also more likely to produce vapor emissions causing product loss and/or emissions that are odorous, explosive, and/or toxic, which are undesirable in view of various environmental regulations and may be potentially harmful to operators and other equipment.

SUMMARY

In accordance with a first exemplary aspect, a valve assembly is provided. The valve assembly is adapted to be coupled to a storage container to relieve vacuum and over pressure conditions in the storage container. The valve assembly includes a body having a first port, a second port, and a third port, the first port adapted to be in fluid communication with the storage container. The body includes a first valve seat disposed adjacent the second port. The valve assembly includes a first control assembly including a first valve stem and a first closure element coupled to the first valve stem. The first closure member is movable relative to the first valve seat in response to changes in pressure in the container. The valve assembly also includes a mounting bracket coupled to a portion of the body. The mounting bracket has a body and an aperture extending through the body. The valve assembly further includes a monitoring device disposed within the aperture of the mounting bracket and proximate to a portion of the first control assembly. The monitoring device is configured to obtain data indicative of the operation of the valve assembly.

In accordance with a second exemplary aspect, a valve assembly is provided. The valve assembly is adapted to be coupled to a storage container to relieve vacuum and over pressure conditions in the storage container. The valve assembly includes a body having a first port, a second port, and a third port, the first port adapted to be in fluid communication with the storage container, the second port adapted to be in fluid communication with the atmosphere or an outlet connection, the third port adapted to be in fluid communication with the atmosphere, the body including a first valve seat disposed adjacent the second port and a second valve seat adjacent the third port. The valve assembly also includes first and second control assemblies. The first control assembly includes a first valve stem and a first closure element coupled to the first valve stem, the first closure member being movable relative to the first valve seat to relieve over pressure in the storage container. The second control assembly includes a second valve stem and a second closure member coupled to the second valve stem, the second closure member being movable relative to the second valve seat to relieve a vacuum pressure in the storage container. The valve assembly also includes a mounting bracket coupled to a portion of the body, the mounting bracket having a body and an aperture extending through the body. The valve assembly further includes a monitoring device slidably disposed within the aperture of the mounting bracket and proximate to a portion of the first or second control assembly, the monitoring device being configured to obtain data indicative of the operation of the valve assembly.

In accordance with a third exemplary aspect, a mounting assembly is provided. The mounting assembly is for use in operably coupling a monitoring device to a valve assembly adapted to be coupled to a storage container to relieve vacuum and over pressure conditions in the storage container. The mounting assembly includes a mounting bracket adapted to be coupled to a portion of a body of the valve assembly, the mounting bracket having a body and an aperture extending through the body. The mounting assembly also includes a mounting tube configured to be slidably disposed within the aperture of the mounting bracket, the mounting tube adapted to receive a monitoring device. The monitoring device is configured to obtain data indicative of the operation of the valve assembly.

In further accordance with any one or more of the foregoing first, second, or third exemplary aspects, a valve assembly and/or a mounting assembly may include any one or more of the following further preferred forms.

In one preferred form, when the pressure in the container is less than a vacuum pressure threshold, such that vacuum conditions exist in the storage container, the first closure member sealingly contacts the first valve seat such that the second port is closed and fluid flows in through the third port, out of the first port, and into the container. When the pressure in the container is greater than an overpressure threshold, such that over pressure conditions exist in the storage container, the first closure member is spaced away from the first valve seat such that the second port is open and fluid flows out of the container, into the first port, and through the second port.

In another preferred form, the body includes a second valve seat disposed adjacent the third port, and the valve assembly further includes a second control assembly. The second control assembly includes a second valve stem and a second closure element coupled to the second valve stem, the second closure member being movable relative to the second valve seat in response to changes in pressure in the container.

In another preferred form, when the pressure in the container is less than a vacuum pressure threshold, such that vacuum conditions exist in the storage container, the first closure member sealingly contacts the first valve seat and the second closure member moves away from the second valve seat, such that the second port is closed, the third port is open, and fluid flows in through the third port, out of the first port, and into the container. When the pressure in the container is greater than an overpressure threshold, such that over pressure conditions exist in the storage container, the second closure member sealingly contacts the second valve seat and the first closure member is spaced away from the first valve seat, such that the third port is closed, the second port is open, and fluid flows out of the container, into the first port, and through the second port.

In another preferred form, the valve assembly includes a screen coupled to the body to fluidly couple the second port to the atmosphere. When the pressure in the container is greater than the overpressure threshold, fluid can flow out of the container, into the first port, through the second port, and out of the valve assembly to the atmosphere via the screen.

In another preferred form, the valve assembly includes a flange adapted to be coupled to a pipe to couple the second port to downstream piping. When the pressure in the container is greater than the overpressure threshold, fluid can flow out of the container, into the first port, through the second port, and out of the valve assembly to the downstream piping.

In another preferred form, the monitoring device is communicatively coupled to a wireless transmitter, which is communicatively coupled to a controller remotely located from the valve assembly. The monitoring device is configured to transmit the obtained data to the controller via the wireless transmitter.

In another preferred form, the monitoring device includes a proximity switch disposed proximate to the first valve stem and configured to obtain data indicative of the operation of the first valve stem.

In another preferred form, the valve assembly includes a hood coupled to the body. The mounting bracket is coupled to a top portion of the hood.

In another preferred form, the hood defines an aperture proximate to an upper end of the first valve stem. The monitoring device is configured to be disposed in the aperture proximate to the upper end of the first valve stem and is configured to obtain data indicative of the position of the first valve stem.

In another preferred form, the valve assembly includes a mounting tube slidably disposed within the aperture of the mounting bracket, the monitoring device being partially disposed in the mounting tube.

In another preferred form, the second port is adapted to be in fluid communication with the atmosphere, and the valve assembly further includes a screen coupled the body to fluidly couple the second port to the atmosphere. When the pressure in the storage container is greater than the overpressure threshold, fluid can flow out of the container, into the first port, through the second port, and out of the valve assembly to the atmosphere via the screen.

In another preferred form, the second port is adapted to be in fluid communication with the outlet connection, and the valve assembly further includes a flange adapted to be coupled to a pipe to couple the second port to downstream piping. When the pressure in the container is greater than the overpressure threshold, fluid can flow out of the container, into the first port, through the second port, and out of the valve assembly to the downstream piping.

In another preferred form, the monitoring device is communicatively coupled to a wireless transmitter, which is communicatively coupled to a controller remotely located from the valve assembly. The monitoring device is configured to transmit the obtained data to the controller via the wireless transmitter.

In another preferred form, the monitoring device includes a proximity switch disposed proximate to the first valve stem and configured to obtain data indicative of the operation of the first valve stem.

In another preferred form, the monitoring device is disposed in the aperture proximate to an upper end of the first valve stem or an upper end of the second valve stem. The monitoring device is configured to obtain data indicative of the position of the first valve stem or the second valve stem.

In another preferred form, the monitoring device and/or the mounting tube is/are field removable.

DETAILED DESCRIPTION

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

FIGS. 1-4 illustrate one example of a pressure vacuum relief valve 100 that can be installed on a storage container (not shown) to provide the storage container with both pressure relief and vacuum relief. The storage container can be a storage tank, a storage vessel, a storage conduit, or other container used to store oil, gas, water, or other products. As noted above, the pressure within the storage container can vary for any number of reasons.

Figure 1:
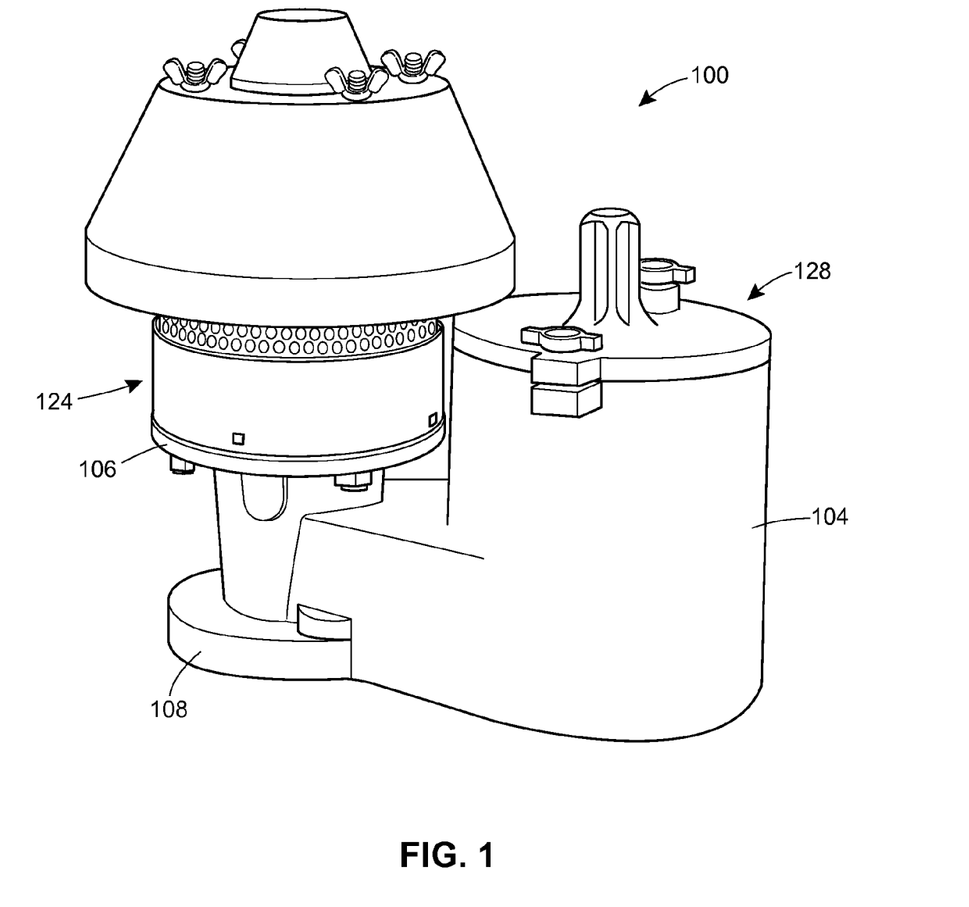
FIG. 1 depicts one example of a pressure vacuum relief valve constructed in accordance with the principles of the present invention.
Figure 2:
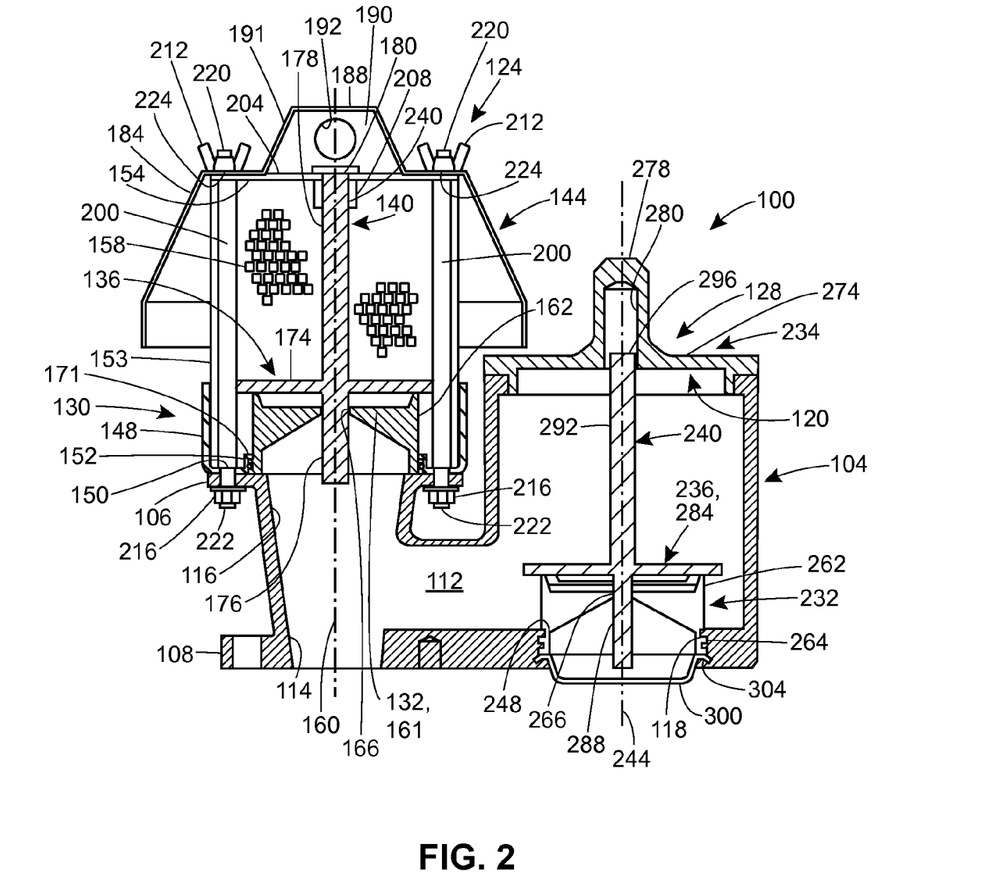
FIG. 2 is cross-sectional view of the pressure vacuum relief valve of FIG. 1.

The pressure vacuum relief valve 100, hereinafter the PVRV 100, illustrated in FIGS. 1-4 is manufactured by Emerson Process Management and is configured for vent-to-atmosphere applications. As illustrated in FIGS. 1 and 2, the PVRV 100 includes a body 104 and first and second flanges 106, 108 formed integrally with the body 104. The first flange 106 faces upward (when viewed in FIGS. 1 and 2) and is for mating with the pressure relief control assembly. The flange 108 faces downward (when viewed in FIGS. 1 and 2) and is for mating with the storage container, which can be done via any known manner.

As best shown in FIG. 2, the body 104 has an internal chamber 112 and defines three ports, a first port 114, a second port 116, and a third port 118, as well as an orifice 120 formed in a top portion of the body 104 opposite the third port 118. The first port 114 is in fluid communication with the interior of the storage container when the flange 108 is mated with the storage container such that the PVRV 100 is installed on the storage container. As such, the first port 114 can fluidly couple the interior of the storage container with the internal chamber 112 of the body 104. The second port 116 is configured to be in fluid communication with the atmosphere when the PVRV 100 provides the storage container with pressure relief, as will be described in greater detail below. The third port 118 is configured to be in fluid communication with the atmosphere when the PVRV 100 provides the storage container with vacuum relief, as will be described in greater detail below.

With reference still to FIG. 2, the PVRV 100 further includes two control assemblies, a first control assembly 124 (also referred to herein as a pressure relief control assembly) and a second control assembly 128 (also referred to herein as a vacuum relief control assembly). The first and second control assemblies 124, 128 are coupled to (and partially disposed within) the body 104 and facilitate pressure relief and vacuum relief, respectively, when necessary.

Figure 3:
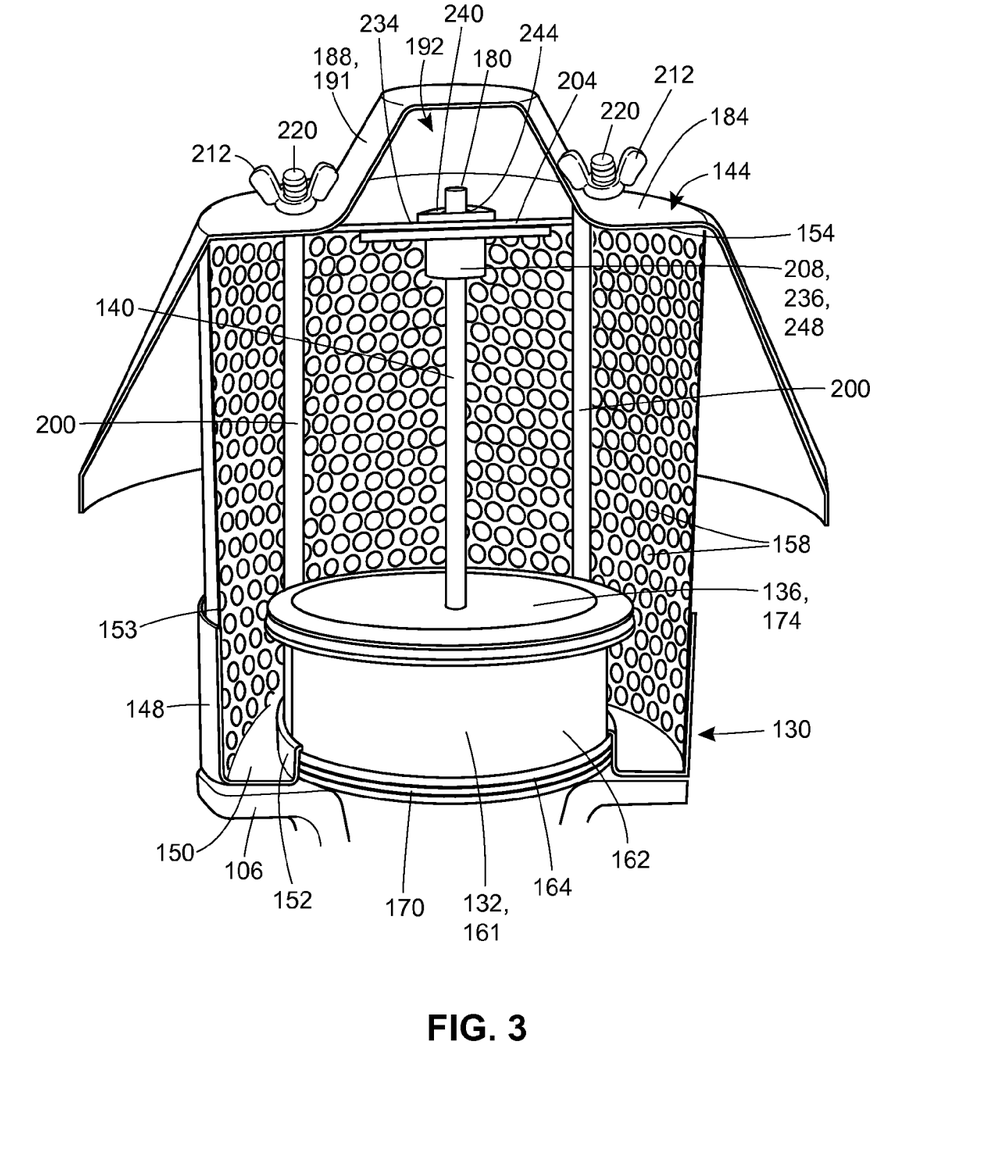
FIG. 3 is a partial cross-sectional view of a pressure relief control assembly of the pressure vacuum relief valve of FIG. 1.

As shown in FIGS. 2 and 3, the first control assembly 124 includes a shield 130, a first valve seat 132, a first closure element 136, a first valve stem 140, and a hood 144. The shield 130 is defined by a cylindrical outer wall 148, a bottom wall 150 that extends inward from a bottom of the outer wall 148, and a curved inner wall 152 that extends upward and inward from the bottom wall 150. The bottom wall 150 is seated on the flange 106 of the body 104, with the walls 148 and 152 extending upward from the flange 106, as best illustrated in FIG. 3. The shield 130 also includes a screen 153 that is integrally formed on an inward side of the outer wall 148 and extends upward from the bottom wall 150, terminating at an end 154 past or above the outer wall 148. The screen 152 includes a plurality of holes 158, which serve to vent fluid from the storage container to the atmosphere surrounding the first control assembly 124 when the PVRV 100 provides pressure relief to the storage container.

As shown in FIGS. 2 and 3, the first valve seat 132 is disposed within the shield 130 at a position adjacent to and aligned with the second port 116, with the first valve seat 132 centered around or about a longitudinal axis 160 of the body 104. The first valve seat 132 has a substantially annularly shaped body 161 defined by an outer wall 162, a flanged portion 164, and a cylindrical bore 166 formed through a central portion of the body 161. The bore 166 is aligned with and extends along the longitudinal axis 160 of the body 104. A recessed area (not shown) is formed in the flange portion 164, within which a gasket 170 is disposed. As best seen in FIG. 3, the first valve seat 132 is retained in position via a lip 171 of the inner wall 152, which extends inward of, and interferingly engages, the flanged portion 164 of the first valve seat 132.

With continued reference to FIGS. 2 and 3, the first closure element 136 is disposed within the shield 130 in alignment with the first valve seat 132. The first closure element 136 in this example takes the form of a pallet that has a pallet disc 174 for sealingly engaging the first valve seat 132. The first valve stem 140 is integrally formed with the first closure element 136 and has a lower portion 176 disposed below or under the pallet disc 174 and an upper portion 178 disposed above the pallet disc 174. The upper portion 178 terminates at an upper end 180.

As shown in FIGS. 2 and 3, the hood 144 is seated or disposed on top of or over the end 154 of the screen 153 of the shield 130. The hood 144 is defined by a body 184 substantially shaped like a trapezoid and a frustoconical nose portion 188 that extends upward from the body 184. The nose portion 188 defines a hollow interior or opening 192 that is sized to receive the first valve stem 140, thereby permitting a pre-determined amount of movement of the first closure element 136 and the first valve stem 140. In this way, the nose portion 188 serves as a stop for the first valve stem 140, preventing any further upward movement of the first valve stem 140 in the event that the first valve stem 140 was to contact the nose portion 188.

The components of the first control assembly 124 are assembled and coupled to the body 104 via a guide assembly. As shown in FIGS. 2 and 3, the guide assembly includes four cylindrical guide rods 200, a guide plate 204, a guide barrel 208, and two sets of nuts 212, 216. The guide rods 200 have a length that is longer than a length of the screen 153 and are oriented parallel to the longitudinal axis 160 and disposed between the walls 148, 152 of the shield 130. A first threaded end 220 of each guide rod 200 extends through and out above a respective aperture 224 formed in the body 184 of the hood 144, while a second threaded end 222 of each guide rod 200 extends through a respective aperture (not visible in FIGS. 2 and 3) formed in the bottom wall 150 of the shield 130 and extends through and out below a respective aperture 232 formed in the flange 106 of the body 104. The guide plate 204 has a thin profile and is connected to and extends between portions of the guide rods 200 adjacent the hood 144. A circular aperture 234 is formed in a central portion of the guide plate 204 and is centered around or about the longitudinal axis 160. The guide barrel 208 is defined by a body 236 and a central bore 240 formed through the body 236. The body 236 has a first annular wall 244 and a second annular wall 248. The diameter of the second annular wall 248 is smaller than the diameter of the circular aperture 234 formed in the guide plate 204, while the diameter of the first annular wall 244 is slightly larger than the diameter of the circular aperture 234, such that the first annular wall 244 rests on, and the guide barrel 208 is retained by, the guide plate 204. As such, the central bore 240 of the guide barrel 208 is also centered around or about the longitudinal axis 160, and the upper end 180 of the first valve stem 140 is movably disposed within the central bore 240. In turn, the nuts 212, which in this example are wingnuts, are screwed onto the first ends 220 of the guide rods 200, and the nuts 216 are screwed onto the second ends 222 of the guide rods 200; this secures the guide rods 200, the guide plate 204, and the guide barrel 208 in position. So constructed, the first closure member 136 is movable in a rectilinear direction along the longitudinal axis 160 and relative to the guide plate 204, the guide barrel 208, and first valve seat 132 to control the flow of fluid through the second port 116.

Figure 4:
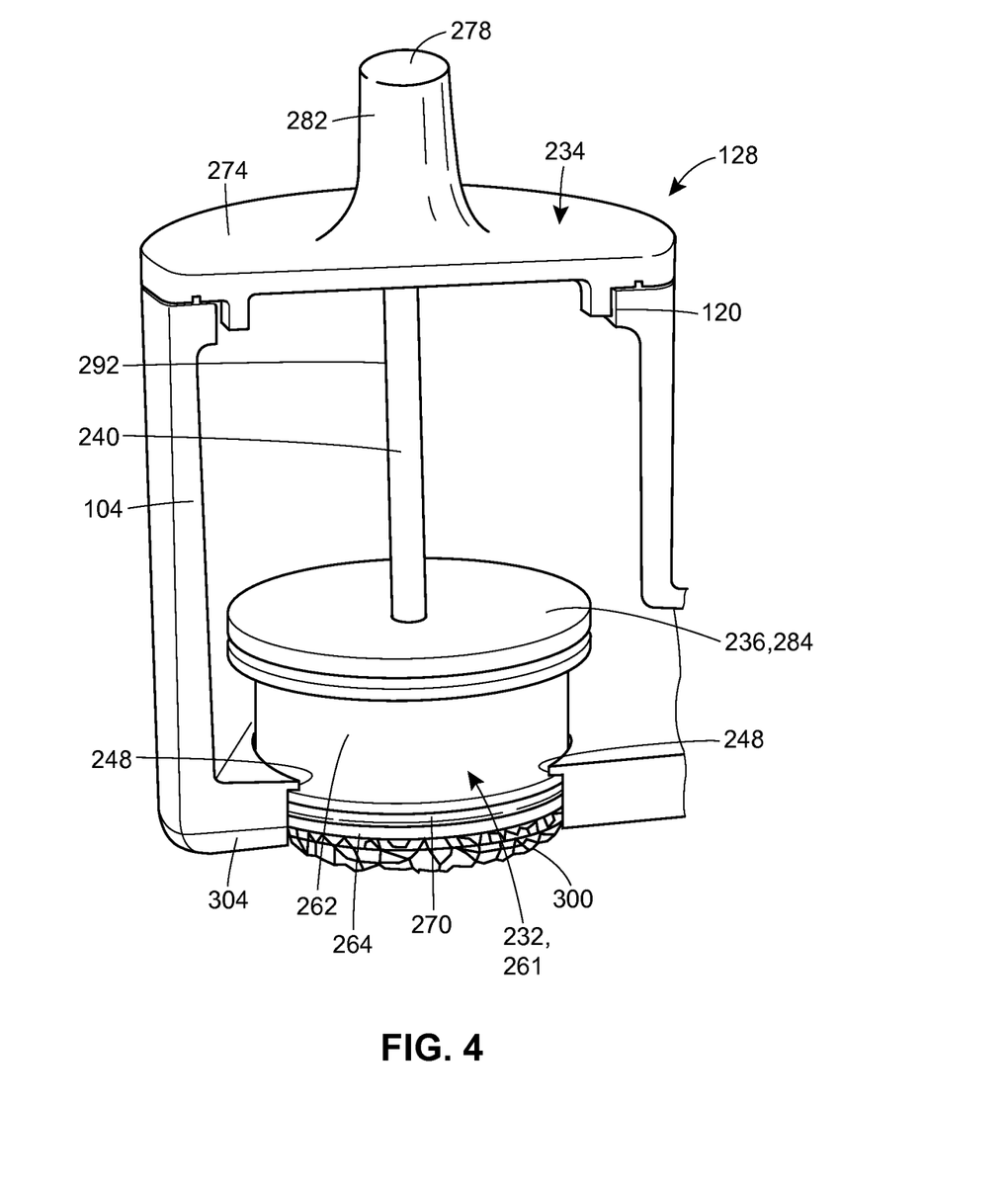
FIG. 4 is a partial cross-sectional view of a vacuum relief control assembly of the pressure vacuum relief valve of FIG. 1.

As shown in FIGS. 2 and 4, the second control assembly 128 includes a second valve seat 232, a lid 234, a second closure element 236, and a second valve stem 240. The second valve seat 232 is identical to the first valve seat 132, with common components indicated by similar reference numerals, but is coupled to the body 104 at a position adjacent and partially within the third port 116, with the second valve seat 232 centered around or about a longitudinal axis 244 of the body 104. Thus, the bore 266 formed through a central portion of the second valve seat 232 is aligned with and extends along the longitudinal axis 244 of the body 104. As best shown in FIG. 4, the first valve seat 232 is retained in position via a lip 248 of the body 104, which extends inward of, and interferingly engages, the flanged portion 264 of the second valve seat 232.

With continued reference to FIGS. 2 and 4, the lid 234 is coupled to a top portion of the body 104, via a plurality of fasteners (not shown), in and/or covering the orifice 120 of the body 104. The lid 234 includes a cylindrical body 274 and a centrally located nose portion 278 that extends upward from the cylindrical body 274. A cylindrical bore 280 is formed in the nose portion 278 and is aligned with and extends along the longitudinal axis 244 of the body 104. Though not illustrated in FIGS. 2 and 4, a circular aperture is formed in a circumferential wall 282 of the nose portion 278. The circular aperture is sized to receive a monitoring device, as will be described.

With continued reference to FIGS. 2 and 4, the second closure element 236 and the second valve stem 240 are disposed within the body 104 in alignment with the second valve seat 232. The second closure element 236, like the first closure element 136, takes the form of a pallet that has a pallet disc 284 for sealingly engaging the second valve seat 232. The second valve stem 240 is integrally formed with the second closure element 236 and has a lower portion 288 disposed below or under the pallet disc 284 and an upper portion 292 disposed above the pallet disc 284. The upper portion 292 terminates at an upper end 296, which is movably disposed within the bore 280 formed in the lid 234. So configured, the second closure element 236 is movable in a rectilinear direction along the longitudinal axis 244 and relative to the second valve seat 182 to control the flow of fluid through the third port 116.

As shown in FIGS. 2 and 4, the second control assembly 128 can also include a barrier 300 configured to keep objects out of the PVRV 100. The barrier 300 in this example is a wire mesh screen, but can in other examples be some other type of barrier (e.g., a gate, another type of screen). The barrier 300 is seated within a narrow retaining slit 304 formed in a bottom portion of the body 104 below the second valve seat 236. Accordingly, the barrier 300 serves to separate the second valve seat 236 and the interior chamber 112 from objects in the atmosphere adjacent the PVRV 100.

Upon initial installation of the PVRV 100, and so long as the internal pressure within the storage container is within a normal range (i.e., the internal pressure is above a minimum or vacuum pressure threshold and is below a maximum pressure threshold or design set point), such that pressure or vacuum relief is not needed, the PVRV 100 is passive. When the PVRV 100 is passive, the first closure element 136, particularly the pallet disc 174, sealingly contacts the first valve seat 132, and the second closure element 236, particularly the pallet disc 284, sealingly contacts the second valve seat 182, as illustrated in FIG. 2. This prevents any fluid from flowing through the second port 112 or the third port 116, thereby maintaining the internal pressure within the storage container substantially unchanged.

When, however, the internal pressure within the storage container falls outside of the normal range, the PVRV 100 is configured to activate and provide pressure or vacuum relief, thereby returning the internal pressure back to a pressure within the normal range. This is because the first control assembly 124, particularly the first closure element 136, and the second control assembly 128, particularly the second closure element 186, are movable responsive to increases or decreases in pressure in the storage container outside of the normal range.

Figure 5:
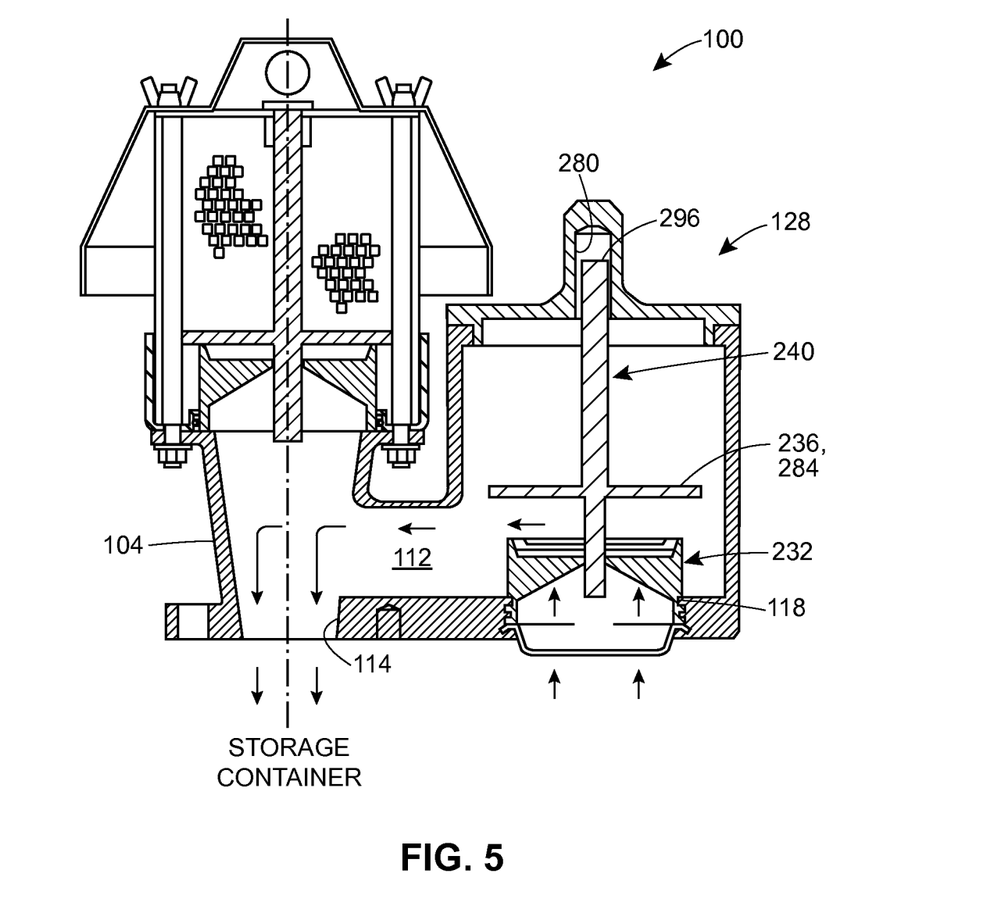
FIG. 5 is a cross-sectional view of the pressure vacuum relief valve of FIG. 1 when the pressure vacuum relief valve is providing vacuum relief to a storage container.

More specifically, when the internal pressure within the storage container falls below the minimum or vacuum pressure threshold (e.g., the value of the atmospheric pressure surrounding the storage container), which may, for example, occur during cold weather, the PVRV 100 is configured to provide vacuum relief, as illustrated in FIG. 5. The internal chamber 112 of the PVRV 100, by being in fluid communication with the interior of the storage container, senses this pressure decrease. As illustrated in FIG. 5, because the pressure within the third port 118 (which is the same as the atmospheric pressure) will be greater than the pressure sensed by the internal chamber 112, the second closure element 236 and the second valve stem 240 move upward, or away from the second valve seat 232, breaking the seal between the second closure element 236 and the second valve seat 232. Fluid (e.g., atmospheric air) can thus flow in through the barrier 300, through the open third port 118 and hollow portions of the body 261 of the second valve seat 232 into the internal chamber 112, out of the first port 114, and into the interior of the storage container (not shown), thereby relieving the vacuum buildup within the storage container and preventing damage to the storage container. When the vacuum buildup within the storage container has been totally relieved (i.e., when the internal pressure within the storage container rises above the minimum pressure threshold), the second closure element 236 falls back downward or toward, and into sealing contact with, the second valve seat 232.

Figure 6:
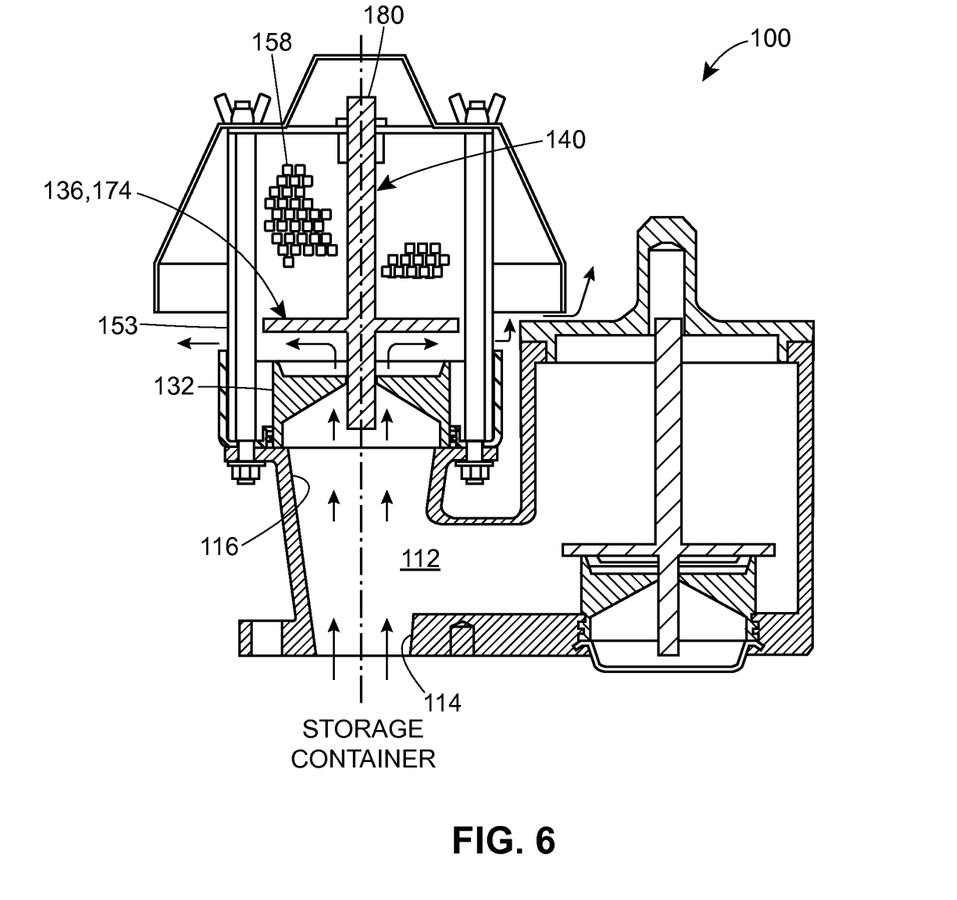
FIG. 6 is a cross-sectional view of the pressure vacuum relief valve of FIG. 1 when the pressure vacuum relief valve is providing pressure relief to the storage container.

On the other hand, when the internal pressure within the storage container rises above the maximum pressure threshold (e.g., a pre-determined safety set point for the storage container), which may, for example, occur during warm weather, the PVRV 100 is configured to provide pressure relief, as illustrated in FIG. 6. The internal chamber 112 of the PVRV 100, by being in fluid communication with the interior of the storage container, senses this pressure increase. As illustrated in FIG. 6, because the pressure sensed by the internal chamber 112 is greater than the pressure above the first closure element 136 (which is the same as atmospheric pressure because of the screen 153), the first closure element 136 and the first valve stem 140 move upward, or away from the first valve seat 132, breaking the seal between the first closure element 136 and the first valve seat 132. Fluid (e.g., vapors) can thus flow out of the storage container, into and through the first port 108, upward through the internal chamber 112, and through the open second port 116 and hollow portions of the body 161 of the first valve seat 132. The fluid can then be vented to the surrounding atmosphere by the screen 153 via the holes 158, thereby relieving the pressure buildup within the storage container and preventing damage to the storage container. When the pressure buildup within the storage container has been totally relieved (i.e., when the internal pressure within the storage container falls below the maximum pressure threshold), the first closure element 136 falls back downward or toward, and into sealing contact with, the first valve seat 132.

It will of course be appreciated that the PVRV 100 can vary and still fall within the intended scope of the present disclosure. While the PVRV 100 is configured for vent-to-atmosphere applications, the PVRV 100 can instead be configured for pipe-away applications. In other examples, the body 104 can be constructed differently. For example, the size and/or shape of the body 104 can vary, the body 104, the ports 114, 116, and 118 can be arranged differently, and/or the body 104 can include an additional flange for fluid connection with a pipe or other outlet connection (e.g., when the PVRV 100 is configured for pipe-away applications). The first and/or second control assemblies 124, 128 can also vary. If desired, the valve seats 132, 232 can vary in shape and/or size and/or can be retained within the body 104 in a different manner (e.g., by a different component). Moreover, the closure elements 136, 236 can vary in shape and/or size and/or can take the form of a plug, disk, or other suitable closure element. The valve stems 140, 240 can vary in shape and/or size and/or need not be integrally formed with the closure elements 136, 236. When the PVRV 100 is configured to pipe-away applications, the PVRV 100 need not include the shield 130, particularly the screen 153, as the PVRV 100 would no longer vent air to atmosphere. The components of the first and second control assemblies 124, 128 can also be coupled to one another and/or to the body 104 in a different manner. Further yet, it will be appreciated that pressure relief and vacuum relief can be accomplished in a different manner than described. For example, pressure relief and vacuum relief can be accomplished using only one control assembly instead of two separate control assemblies 124, 128 as illustrated herein.

As described above, pressure vacuum relief valves, such as the PVRV 100, are installed on top of storage containers, and are therefore difficult to access and monitor while in operation, which can lead to a whole host of problems. Accordingly, the present disclosure provides a monitoring device that can be coupled to the PVRV 100 to monitor the operation of the PVRV 100. The monitoring device disclosed herein is operably and removably coupled to the body 104 of the PVRV 100 via a mounting assembly (e.g., a tube and bracket assembly). In turn, the monitoring device can obtain data associated with the operation of the PVRV 100. Specifically, the monitoring device can obtain data indicative of the usage of the PVRV 100, such as, for example, data indicative of whether the PVRV 100 is open (i.e., providing relief) or closed, the degree that the PVRV 100 is open or closed, how often the state of the PVRV 100 changes (between being open and closed), the amount of fluid flowing through the PVRV 100, the noise due to the PVRV 100, and/or any other data that may be useful in analyzing the PVRV 100. The monitoring device, which is preferably coupled to a process control network (e.g., a remotely located controller for a process control network) via a wired and/or wireless coupling (e.g., a wireless transmitter), can transmit the obtained data to and/or receive data (e.g., operational instructions) from the process control network (e.g., the remotely located controller) via the coupling. This allows the PVRV 100 to be remotely monitored by the process controller and/or operators within the process control network.

Figure 7:
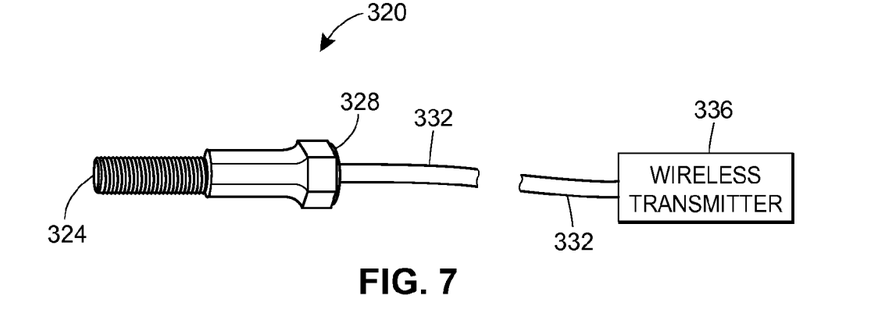
FIG. 7 depicts a monitoring device that can be coupled to the pressure vacuum relief valve of FIG. 1 via a mounting assembly.

FIG. 7 depicts an exemplary monitoring device 320 constructed in accordance with the present disclosure. In this example, the monitoring device 320 is a proximity switch (e.g., a TopWorx® GO Switch) that has a threaded first end 324 and a second end 328 disposed opposite the first end 324. The monitoring device 320 includes a conduit 332 that extends outward from the second end 328 and is fed to a wireless transmitter 336, such as the Rosemount 702 Wireless Discrete Transmitter, that is communicatively connected to the process control network. The wireless transmitter 336 can also be coupled to the PVRV 100 or can be coupled to the storage container or some other component in the process control environment. Alternatively, the conduit 332 can be communicatively connected to the process control network in a different manner (e.g., via a different wireless coupling and/or via a wired coupling).

The proximity switch 320 is generally configured to detect targets (e.g., magnets) that are coupled to an object (e.g., a valve stem) to determine one or more operational parameters of the object, such as the position of the valve stem. In this example, the proximity switch 320 is configured to detect a target (e.g., a magnet) coupled to the first valve stem 140 or the second valve stem 240 to determine the position of the valve stem 140, 240. In turn, the proximity switch 320 can transmit, via the conduit 332, any obtained data to the wireless transmitter 336 for distribution to the process control network (e.g., to a remotely located controller). The proximity switch 320 can likewise receive data (e.g., instructions) from the wireless transmitter via the conduit 332.

In other examples, the proximity switch 320 can be configured to detect a target coupled to a different portion of the PVRV 100 (e.g., a different portion of the first control assembly 124 or the second control assembly 128) to determine similar or different operational parameters (e.g., the position of the closure element 136, 236). The monitoring device 320 can also take the form of a different switch (e.g., a limit switch), a sensor (e.g., a flow sensor, a noise sensor, an optical sensor, an ultrasonic sensor), or another type of device suitable for monitoring the operation of components in a process control environment. When the monitoring device 320 takes on a different form, the monitoring device 320 can obtain similar or different data (e.g., flow data, noise data, etc.) indicative of the operation of the PVRV 100, thereby allowing similar or different operational aspects of the PVRV 100 to be remotely monitored.

Figure 8:
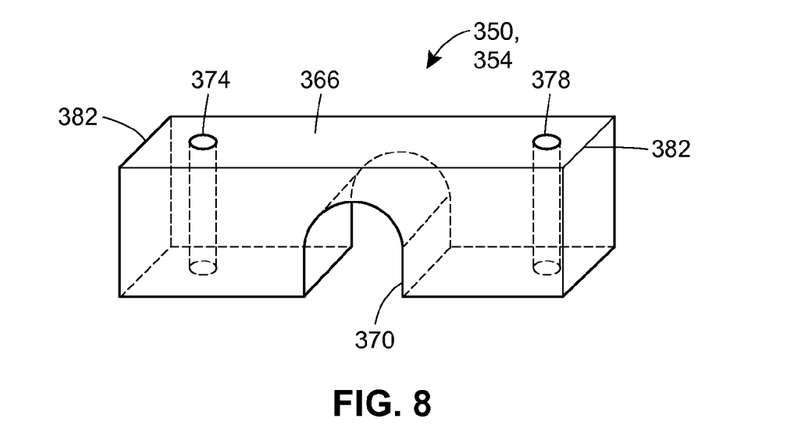
FIG. 8 depicts a mounting bracket of the mounting assembly.
Figure 9:
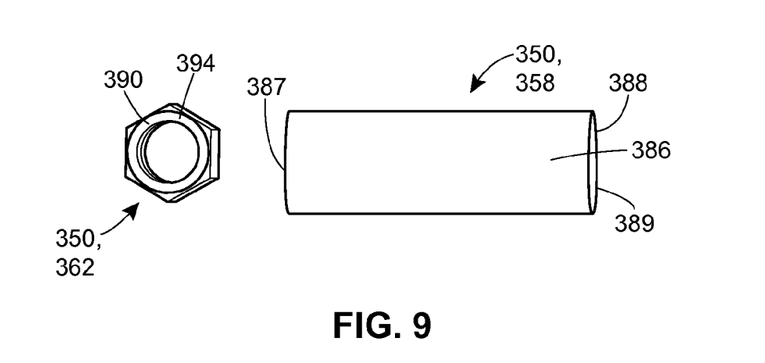
FIG. 9 depicts a mounting tube and mounting nut of the mounting assembly.

FIGS. 8 and 9 depict components of an exemplary mounting assembly 350 that can be used to couple the monitoring device 320 to the PVRV 100. In this example, the mounting assembly 350 is a tube and bracket assembly that can be used to couple the monitoring device 320 to the hood 144 of the PVRV 100. The mounting assembly 350 includes a mounting bracket 354, a tube 358, and a nut 362. As illustrated in FIG. 8, the mounting bracket 354 has a body 366 and three apertures 370, 374, and 378 formed in the body 366. The body 366 in this example has the shape of a cuboid or a rectangular prism (or a rectangle, when viewed in cross-section). The first aperture 370 is a U-shaped aperture that extends through a central portion of the body 366 in a transverse direction. The first aperture 370 is sized to receive the tube 358 therein, as will be described. The second and third apertures 374, 378 are cylindrically shaped apertures that extend through the body 366 in a longitudinal direction (perpendicular to the transverse direction) at or proximate to respective ends 382 of the body 366. The second and third apertures 374, 378 are sized to receive the guide rods 200 of the PVRV 100 so as to facilitate the attachment of the mounting bracket 354 to the body 104 of the PVRV 100, as will be described.

As illustrated in FIG. 9, the tube 358 has a body 386 having a cylindrical shape and defining a first end 387 and a second end 388 opposite the first end 387. The body 386 defines or includes a hollow interior 389 (not particularly visible in FIG. 9) that is sized to receive the monitoring device 320, as will be described. As also illustrated in FIG. 9, the nut 362 in this example has a hexagonal body 390 and a circular aperture 394 formed or defined in the body 390. The circular aperture 394 has a diameter that is larger than the hollow interior of the tube body 386 and is sized to receive the threaded end 324 of the monitoring device 320, as will be described. The nut 362 can facilitate the coupling of the monitoring device 320 with the tube 358, as will also be described.

In other examples, the mounting assembly 350 can vary and still fall within the intended scope of the present disclosure. The mounting bracket 354 can have a different shape (e.g., a cylindrical shape) and/or can have a different size. The tube 358 can have a different shape (e.g., a rectangular shape) and/or can have a different size. For example, the tube 358 can define a smaller or larger hollow interior 389 (e.g., to accommodate a different sized or shaped monitoring device 320) and/or can have a different length (e.g., can be shorter or longer), depending on the desired application. When the tube 358 varies in shape and/or size, the first aperture 370 of the mounting bracket 354 can similarly vary in shape and/or size.

Figure 10:
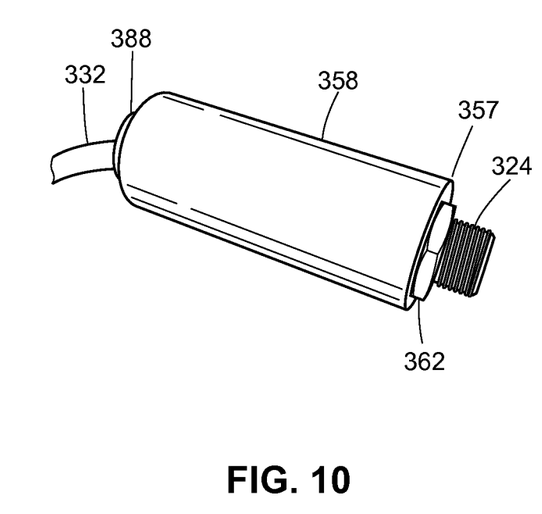
FIG. 10 illustrates the monitoring device of FIG. 7 coupled to the mounting tube of FIG. 9.

FIG. 10 illustrates the monitoring device 320 coupled to the tube 358. As illustrated in FIG. 10, the monitoring device 320 is disposed within the tube 358 such that the first end 324 of the monitoring device 320 extends outward of the first end 387 of the tube 358 (i.e., is exposed), the second end 328 of the monitoring device 320 is substantially, if not entirely, disposed within the tube 358, and the conduit 332 extends outward from the second end 388 of the tube 358 (for connection to the wireless transmitter 336). The nut 362 is screwed onto the threaded end 324 of the monitoring device 320 and secures the monitoring device 320 in the described position.

Figure 11:
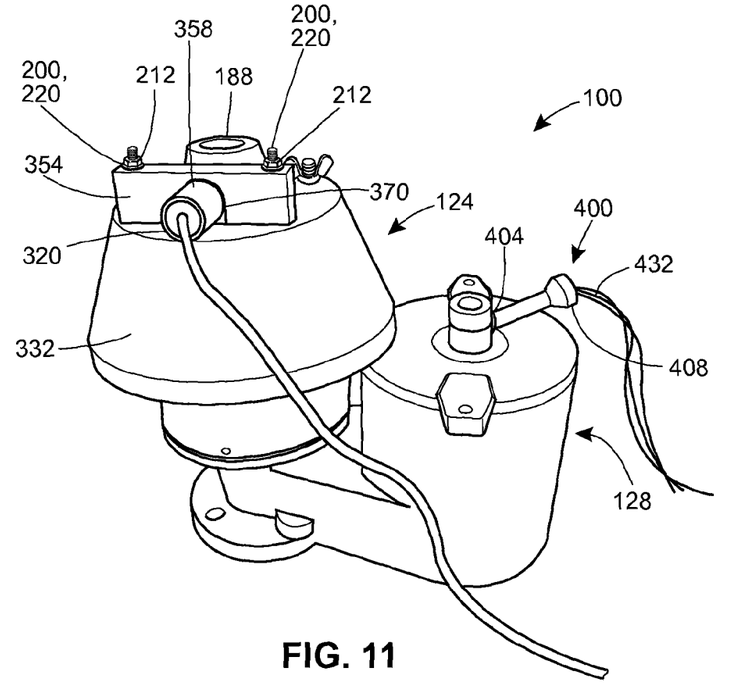
FIG. 11 is a perspective view of the monitoring device of FIG. 7 coupled to the pressure vacuum relief valve of FIG. 1 via the mounting assembly illustrated in FIGS. 8 and 9.
Figure 12:
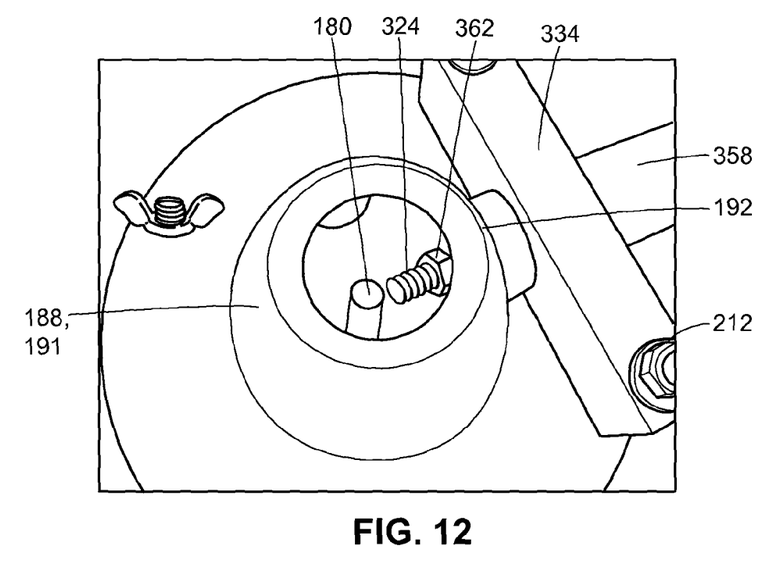
FIG. 12 is a close-up top view of the monitoring device of FIG. 7 when coupled to the pressure vacuum relief valve of FIG. 1 via the mounting assembly illustrated in FIGS. 8 and 9.

FIGS. 11 and 12 illustrate the mounting assembly 350 as fully assembled and used to operably couple the monitoring device 320 to the first valve stem 140 of the PVRV 100 Although not discussed above, an opening 192 is formed in a circumferential wall 191 of the nose portion 188 (see FIG. 2) equidistant between two of the guide rods 200. As best shown in FIG. 12, the mounting bracket 354 is coupled to the hood 144 so that the bracket 354 is proximate to and aligned with this opening 192. More specifically, the first end 220 of each of the two guide rods 200 most proximate to the opening 192 (formed in the nose portion 188) is disposed through and out of a respective one of the second and third apertures 374, 378 of the bracket 354, such that the U-shaped aperture 370 of the bracket 354 is aligned with the opening 192. The nuts 212, which are screwed onto the first ends 220 of each of the guide rods 200, secure the mounting bracket 354 in the desired position.

It will be appreciated that the bracket 354 can be coupled to the hood 144 before or after the monitoring device 320 is disposed within the tube 358. Regardless, when the bracket 354 is coupled to the hood 144 and the monitoring device 320 is disposed within the tube 358, the tube 358, which carries the monitoring device 320, is slidably coupled to the mounting bracket 354. More specifically, the tube 358 is inserted into and through the aperture 370 of the bracket 354. The first end 387 of the tube 358 is inserted into the opening 192 formed in the hood 144, such that the first end 324 of the monitoring device 320 is disposed proximate to the upper end 180 of the first valve stem 140. It will be appreciated that the position of the tube 358, and thus the monitoring device 320, can be adjusted, relative to the upper end 180 of the first valve stem 140 and the mounting bracket 354 by sliding the tube 358 toward or away from the upper end 180 of the first valve stem 140. This facilitates an easily and field adjustable monitoring device 320.

In other examples, the mounting bracket 354 can be coupled to the hood 144 in a different manner (e.g., via a magnetic connection). The tube 358 can also be coupled to the mounting bracket 354 in a different manner (e.g., via a hook and latch mechanism, via a magnetic connection). Moreover, the mounting assembly 350 can instead be used to operably couple the monitoring device 320 to a different portion of the first control assembly 124, to the second control assembly 128 (e.g., to the second valve stem 240 of the PVRV 100), or to another portion of the PVRV 100. To this end, the mounting bracket 354 can be secured to a different portion of the PVRV 100, such as, for example, within the PVRV 100, to the lid 234 of the second control assembly 128, or to some other component. Moreover, two mounting assemblies 350 can be used to operably couple two monitoring devices 320 to the body 104 of the PVRV. For example, one mounting assembly 350 can be used to operably couple one monitoring device 320 to the first valve stem 140, while another mounting assembly 350 can be used to operably couple another monitoring device 320 to the second valve stem 240.

It should be appreciated that the monitoring device 320 and the components of the mounting assembly 350 are field removable and replaceable. For example, the mounting tube 358 can be quickly and easily removed and replaced with a new mounting tube 358. Moreover, it should also be appreciated that existing pressure vacuum relief valves can be retrofitted to include the monitoring device 320 via the mounting assembly 350. Finally, it should be appreciated that the mounting assembly 350 can be used in connection with pressure vacuum relief valves other than the PVRV 100, thereby allowing the monitoring device 320 or other monitoring devices to be used in connection other pressure vacuum relief valves. For example, the mounting assembly 350 can be used in connection with other pressure vacuum relief valves manufactured by Emerson Process Management, such as, for example, the ENARDO Series 800-SO pressure vacuum vent, the ENARDO Series 900-SO pressure vacuum vent, the ENARDO Series ES-900-SO pressure vacuum vent, the ENARDO Series ES-900-SO pressure vacuum vent, the ENARDO Series 450 pressure vacuum relief valve, the ENARDO Series 550 pressure vacuum relief valve, the ENARDO Series 850 pressure vacuum relief valve, the ENARDO Series 850/MVC pressure vacuum relief valve, the ENARDO Series 860 vacuum relief valve, and the ENARDO Series 960 vacuum relief valve. The mounting assembly 350 can be coupled to other pressure vacuum relief valves in a similar manner (e.g., using guide rods of those valves) or in a different manner.

With the monitoring device 320 arranged in the described manner, the monitoring device 320, which in this example is a proximity switch, can detect a target (e.g., a magnet) coupled to the first valve stem 140 (e.g., the upper end 180) to monitor the position of the first valve stem 140. Accordingly, the monitoring device 320 can detect when the PVRV 100, particularly the pressure relief assembly 124, is open or closed, as well the degree to which the PVRV 100, particularly the pressure relief assembly 124, is open or closed. For example, when the PVRV 100 provides pressure relief to the storage container, such that the first closure element 136 and the first valve stem 140 move upward, or away from the first valve seat 132 (see FIG. 6), the monitoring device 320, by virtue of being disposed proximate to the upper end 180 of the first valve stem 140, can detect this movement and the degree of this movement. Likewise, when the PVRV 100 has relieved the storage container, such that the first closure element 136 and the first valve stem 140 fall back to their initial positions (see FIG. 2), the monitoring device 320 can detect this movement and the degree of this movement.

With reference still to FIGS. 11 and 12, the PVRV 100 in this example includes another monitoring device 400 that is identical to the monitoring device 320 (with common components indicated by similar reference numerals), but is coupled to the lid 234 of the second control assembly 128 without the help of a mounting assembly 350. Instead, the threaded end 404 of the mounting device 400 is inserted into and through an aperture (not shown) formed in the nose portion 278 of the lid 234, such that the threaded end 404 of the mounting device 400 is disposed proximate, and is operably coupled, to the upper end 296 of the second valve stem 240. So arranged, the monitoring device 400, which in this example is also a proximity switch, can detect a target (e.g., a magnet) coupled to the second valve stem 240 (e.g., the upper end 296) to monitor the position of the second valve stem 240. Accordingly, the monitoring device 400 can detect when the PVRV 100, particularly the vacuum relief assembly 128, is open or closed, as well the degree to which the PVRV 100, particularly the vacuum relief assembly 128, is open or closed. For example, when the PVRV 100 provides vacuum relief to the storage container, such that the second closure element 236 and the second valve stem 240 move upward, or away from the first valve seat 232 (see FIG. 5), the monitoring device 400, by virtue of being disposed proximate to the upper end 296 of the second valve stem 240, can detect this movement and the degree of this movement. Likewise, when the PVRV 100 has relieved the storage container, such that the second closure element 236 and the second valve stem 240 fall back to their initial positions (see FIG. 2), the monitoring device 400 can detect this movement and the degree of this movement.

In other examples, the monitoring device 400 can be a different monitoring device (e.g., a limit switch, a flow sensor, a noise sensor, etc.). When the monitoring device 400 takes on a different form, the monitoring device 400 can obtain similar or different data (e.g., flow data, noise data, etc.) indicative of the operation of the PVRV 100. In other examples, the monitoring device 400 can be operably coupled to the second valve stem 240 using the mounting assembly 350 or another mounting assembly. Alternatively, the PVRV 100 need not include the monitoring device 400 (i.e., the PVRV 100 can only include the monitoring device 300 and/or different monitoring devices).

The monitoring device 320 can transmit any obtained data to the wireless transmitter (or other coupling) via the conduit 332. In this example, the monitoring device 320 can transmit data indicative of the position of the first valve stem 140 to the wireless transmitter 336. Similarly, the monitoring device 400 can, via the conduit 432, transmit any obtained data to the wireless transmitter 336. In this example, the monitoring device 400 can transmit data indicative of the position of the second valve stem 240 to the wireless transmitter 336. In other examples, the monitoring device 320 and/or the monitoring device 400 can transmit other data indicative of the operation of the PVRV 100, such as, for example, data indicative of the amount of fluid flowing through the PVRV 100, the noise due to the PVRV 100, emissions released by the PVRV 100, or any other data, to the wireless transmitter 336.

The wireless transmitter 336 can, when desired, transmit any obtained data to a remotely located process controller of the process control network. The process controller, which may be, by way of example, a DeltaV™ controller sold by Emerson Process Management, can thus remotely monitor the operation of the PVRV 100. More specifically, the process controller, as well as any users of the process controller, can remotely and readily determine whether the PVRV 100 is open or closed, the degree to which the PVRV 100 is open or closed, how often the PVRV 100 opens or closes, as well as other operational information.

The process controller, and/or users of the process controller, can also analyze (e.g., aggregate, sum, integrate, compare) the data, as well as any other data obtained from components in the process control network, to assess the diagnostics of the PVRV 100 (e.g., assess whether the PVRV 100 is the appropriate size, is operating properly, is in need of maintenance, etc.). For example, if it is determined (by the process controller and/or the users of the controller) that the PVRV 100 is open (i.e., providing relief) 100% of the time, it can be determined that the PVRV 100 is not the proper size for the storage container. As another example, if it is determined that the PVRV 100 is constantly operating in the so-called "flutter zone" (i.e., it is frequently, if not constantly, oscillating), it can be determined that the PVRV 100 is not the proper size for the storage container. As yet another example, if the storage container is being filled or drained, but the data obtained from the PVRV 100 does not indicate any state change (e.g., any change in the position of the valve stem 140 or the valve stem 240), it may be determined that the storage container should be shut down for safety reasons. As a further example, the total amount of venting and/or emissions can be determined based on the obtained data (e.g., by integrating the position data).

Based on the foregoing description, it should be appreciated that the devices, systems, and methods described herein provide a mounting assembly for coupling a monitoring device to a pressure vacuum relief valve, such that the pressure vacuum relief valve can be remotely monitored. Accordingly, it is possible to remotely determine whether the pressure vacuum relief valve is operating properly, whether the pressure vacuum relief is the appropriate size, and whether the pressure vacuum relief valve is causing unacceptable product loss and/or undesirable emissions (e.g., a high level of emissions, emissions that are odorous, explosive, and/or toxic). In turn, this will enhance the safety of the pressure vacuum relief valve and provide environmental (emissions) control.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A valve assembly adapted to be coupled to a storage container to relieve vacuum and over pressure conditions in the storage container, the valve assembly comprising:

a body having a first port, a second port, and a third port, the first port adapted to be in fluid communication with the storage container, the body including a first valve seat disposed adjacent the second port;
a first control assembly comprising a first valve stem and a first closure element coupled to the first valve stem, the first closure member being movable relative to the first valve seat in response to changes in pressure in the container;
a cover coupled to the body;
a mounting bracket coupled to a portion of the cover, the mounting bracket having a bracket body and a mounting aperture extending through the bracket body; and
a monitoring device disposed within the mounting aperture of the mounting bracket and disposed within an aperture formed in the cover such that the monitoring device is disposed proximate to a portion of the first control assembly, the monitoring device being configured to obtain data indicative of the operation of the valve assembly.

2. The valve assembly of claim 1, wherein when the pressure in the container is less than a vacuum pressure threshold, such that vacuum conditions exist in the storage container, the first closure member sealingly contacts the first valve seat such that the second port is closed and fluid flows in through the third port, out of the first port, and into the container, and wherein when the pressure in the container is greater than an overpressure threshold, such that over pressure conditions exist in the storage container, the first closure member is spaced away from the first valve seat such that the second port is open and fluid flows out of the container, into the first port, and through the second port.

3. The valve assembly of claim 1, wherein the body includes a second valve seat disposed adjacent the third port, the valve assembly further comprising: a second control assembly comprising a second valve stem and a second closure element coupled to the second valve stem, the second closure member being movable relative to the second valve seat in response to changes in pressure in the container.

4. The valve assembly of claim 3, wherein when the pressure in the container is less than a vacuum pressure threshold, such that vacuum conditions exist in the storage container, the first closure member sealingly contacts the first valve seat and the second closure member is spaced away from the second valve seat, such that the second port is closed, the third port is open, and fluid flows in through the third port, out of the first port, and into the container, and wherein when the pressure in the container is greater than an overpressure threshold, such that over pressure conditions exist in the storage container, the second closure member sealingly contacts the second valve seat and the first closure member is spaced away from the first valve seat, such that the third port is closed, the second port is open, and fluid flows out of the container, into the first port, and through the second port.

5. The valve assembly of claim 4, further comprising a screen coupled the body to fluidly couple the second port to the atmosphere, wherein when the pressure in the container is greater than the overpressure threshold, fluid can flow out of the container, into the first port, through the second port, and out of the valve assembly to the atmosphere via the screen.

6. The valve assembly of claim 1, wherein the monitoring device is communicatively coupled to a wireless transmitter, the wireless transmitter communicatively coupled to a controller remotely located from the valve assembly, the monitoring device configured to transmit the obtained data to the controller via the wireless transmitter.

7. The valve assembly of claim 1, wherein the monitoring device comprises a proximity switch disposed proximate to the first valve stem and configured to obtain data indicative of the operation of the first valve stem.

8. The valve assembly of claim 1, wherein the cover comprises a hood, the mounting bracket being coupled to a top portion of the hood.

9. The valve assembly of claim 8, wherein the hood includes the aperture, the aperture arranged proximate to an upper end of the first valve stem, the monitoring device configured to be disposed in the aperture of the hood proximate to the upper end of the first valve stem and configured to obtain data indicative of the position of the first valve stem.

10. The valve assembly of claim 1, further comprising a mounting tube slidably disposed within the aperture of the mounting bracket, the monitoring device being partially disposed in the mounting tube.

11. A valve assembly adapted to be coupled to a storage container to relieve vacuum and over pressure conditions in the storage container, the valve assembly comprising:
a body having a first port, a second port, and a third port, the first port adapted to be in fluid communication with the storage container, the second port adapted to be in fluid communication with the atmosphere or an outlet connection, the third port adapted to be in fluid communication with the atmosphere, the body including a first valve seat disposed adjacent the second port and a second valve seat adjacent the third port;
a first control assembly comprising a first valve stem and a first closure element coupled to the first valve stem, the first closure member being movable relative to the first valve seat to relieve over pressure in the storage container;
a second control assembly comprising a second valve stem and a second closure member coupled to the second valve stem, the second closure member being movable relative to the second valve seat to relieve a vacuum pressure in the storage container;
a cover coupled to the body;
a mounting bracket coupled to a portion of the cover, the mounting bracket having a bracket body and a mounting aperture extending through the bracket body; and
a monitoring device slidably disposed within the mounting aperture of the mounting bracket and disposed within an aperture formed in the cover such that the monitoring device is disposed proximate to a portion of the first or second control assembly, the monitoring device being configured to obtain data indicative of the operation of the valve assembly.

12. The valve assembly of claim 11, wherein when the pressure in the storage container is less than a vacuum pressure threshold, such that vacuum conditions exist in the storage container, the first closure member sealingly contacts the first valve seat and the second closure member is spaced away from the second valve seat, such that the second port is closed, the third port is open, and fluid flows in through the third port, out of the first port, and into the container, and wherein when the pressure in the storage container is greater than an overpressure threshold, such that over pressure conditions exist in the storage container, the second closure member sealingly contacts the second valve seat and the first closure member is spaced away from the first valve seat, such that the third port is closed, the second port is open, and fluid flows out of the container, into the first port, and through the second port.

13. The valve assembly of claim 11, wherein the second port is adapted to be in fluid communication with the atmosphere, the valve assembly further comprising a screen coupled the body to fluidly couple the second port to the atmosphere, wherein when the pressure in the storage container is greater than the overpressure threshold, fluid can flow out of the container, into the first port, through the second port, and out of the valve assembly to the atmosphere via the screen.

14. The valve assembly of claim 11, wherein the monitoring device is communicatively coupled to a wireless transmitter, the wireless transmitter communicatively coupled to a controller remotely located from the valve assembly, the monitoring device configured to transmit the obtained data to the controller via the wireless transmitter.

15. The valve assembly of claim 11, wherein the monitoring device comprises a proximity switch disposed proximate to the first valve stem and configured to obtain data indicative of the operation of the first valve stem.

16. The valve assembly of claim 11, wherein the monitoring device is disposed in the mounting aperture proximate to an upper end of the first valve stem or an upper end of the second valve stem, the monitoring device configured to obtain data indicative of the position of the first valve stem or the second valve stem.

17. The valve assembly of claim 11, further comprising a mounting tube slidably disposed within the mounting aperture of the mounting bracket, the monitoring device being partially disposed in the mounting tube.

18. The valve assembly of claim 11, wherein the monitoring device is field removable.

* * * * *

UNITED STATES PATENT AND TRADEMARK OFFICE
CERTIFICATE OF CORRECTION

PATENT NO. : 9,777,855 B2  Page 1 of 1
APPLICATION NO. : 14/931521
DATED : October 3, 2017
INVENTOR(S) : James Myers et al.

It is certified that error appears in the above-identified patent and that said Letters Patent is hereby corrected as shown below:

In the Specification

At Column 4, Line 27, "is cross-sectional" should be -- is a cross-sectional --.

At Column 5, Line 63, "screen 152" should be -- screen 153 --.

At Column 7, Line 21, "third port 116," should be -- third port 118, --.

At Column 7, Lines 26-27, "first valve seat 232" should be -- second valve seat 132 --.

At Column 7, Line 57, "third port 116." should be -- third port 118. --.

At Column 7, Line 65, "second valve seat 236." should be -- second valve seat 232. --.

At Column 7, Line 66, "second valve seat 236" should be -- second valve seat 232 --.

At Column 8, Line 12, "second port 112" should be -- second port 116 --.

At Column 8, Lines 12-13, "third port 116," should be -- third port 118, --.

At Column 9, Line 2, "first port 108," should be -- first port 114, --.

At Column 13, Line 25, "mounting device" should be -- monitoring device --.

At Column 13, Line 28, "mounting device" should be -- monitoring device --.

At Column 13, Line 41, "first valve seat 232" should be -- second valve seat 232 --.

Signed and Sealed this
Third Day of July, 2018

Andrei Iancu
*Director of the United States Patent and Trademark Office*